United States Patent
Wall, II

(10) Patent No.: US 7,264,299 B2
(45) Date of Patent: Sep. 4, 2007

(54) VEHICLE HOOD COVER

(75) Inventor: Billy Russell Wall, II, College Grove, TN (US)

(73) Assignee: X-Treme Sports Group, LLC., Nashville, TN (US)

( * ) Notice: Subject to any disclaimer, the term of this patent is extended or adjusted under 35 U.S.C. 154(b) by 69 days.

(21) Appl. No.: 11/154,276

(22) Filed: Jun. 16, 2005

(65) Prior Publication Data
US 2006/0284444 A1 Dec. 21, 2006

(51) Int. Cl.
*B60J 7/00* (2006.01)
(52) U.S. Cl. .................................. 296/136.07
(58) Field of Classification Search ........... 296/136.07, 296/136.01, 136.08, 136.1, 136.13, 193.11
See application file for complete search history.

(56) References Cited

U.S. PATENT DOCUMENTS

| | | | | |
|---|---|---|---|---|
| 4,997,229 | A * | 3/1991 | Swanson | 296/136.08 |
| 5,042,836 | A * | 8/1991 | Swanson | 280/770 |
| 5,328,230 | A * | 7/1994 | Curchod | 296/136.04 |
| 5,820,196 | A * | 10/1998 | Rudys et al. | 296/136.08 |
| 5,845,958 | A * | 12/1998 | Rudys et al. | 296/136.08 |
| 5,927,793 | A * | 7/1999 | McGrath, Jr. | 296/136.13 |
| 5,941,593 | A * | 8/1999 | McCann | 296/136.1 |
| 6,273,493 | B1 | 8/2001 | Woo | |
| 6,371,547 | B1 * | 4/2002 | Halbrook | 296/136.07 |
| 6,491,335 | B1 * | 12/2002 | Cohill | 296/137.07 |
| 6,588,827 | B2 * | 7/2003 | Heiland | 296/136.1 |
| 6,893,074 | B1 * | 5/2005 | Wilson | 296/136.02 |
| 7,017,969 | B1 * | 3/2006 | Kirkham et al. | 296/39.1 |
| 2005/0139300 | A1 * | 6/2005 | Harmon | 150/166 |
| 2005/0280283 | A1 * | 12/2005 | Douglas | 296/136.1 |

OTHER PUBLICATIONS

U.S. Appl. No. 60/558,747, Wall.

* cited by examiner

*Primary Examiner*—H Gutman
(74) *Attorney, Agent, or Firm*—R. Tracy Crump

(57) ABSTRACT

The hood cover is constructed from a sheet of elastic, weather-resistant fabric, which allows the hood cover to stretch tightly around the peripheral edges of the vehicle hood and lie flat across the top surface of the vehicle hood. The hood cover is secured to the vehicle hood by a draw string and by two adjustable tension straps. The first tension strap pulls the hood cover tight around rear hood corners. The second tension strap pulls the hood cover tight around the convex leading edge and the concave rear edge of the vehicle hood. The fabric from which the hood cover is constructed prevents the distortion of decorative graphic artwork within certain areas of the hood cover. The blend, weave and sett of the fabric gives the hood cover "sequential elasticity" that allows fabric stretch to be isolated and localized around the periphery of the vehicle hood so that the central area of the hood cover remains primarily "unstretched." Consequently, graphics and artwork can be applied and arranged on the hood cover to minimize any distortions caused by stretching the hood cover over any particular vehicle hood.

10 Claims, 8 Drawing Sheets

VEHICLE HOOD COVER

This invention relates to a decorative hood cover for an automobile, and in particular a hood cover with printed decorative graphics that can be fitted to any automobile hood regardless of size, shape or style without substantially distorting the appearance of any decorative graphics or artwork.

BACKGROUND OF THE INVENTION

Automobile hood covers and "bras" are a common automobile accessory. Hood covers and bras protect the hood and front of the vehicle from damages from bugs, stones and other debris, as well as, hide paint chips, scratches, and dings. Hood covers and bras can also enhance the aesthetic appearance of the vehicle. Heretofore, conventional hood covers have been unable to incorporate the combination of two desirable features, namely, a hood cover which can be fitted to any vehicle hood regardless of size, shape or style, and a hood cover which can be decorated with dye sublimation graphics without distorting the graphics when fitted to vehicle hoods of differing sizes, shapes and styles.

Heretofore, decorative hood covers and bras have been constructed of vinyl with cloth or fleece liners. The vinyl material provides a durable weather proof material, which can be decorated with embroidery and dye sublimation. But, vinyl lacks the elasticity to be applied in a one size fits all hood cover. Consequently, vinyl hood covers are custom designed to fit the unique size, shape and style of each individual vehicle. Vinyl hood covers and bras often have a cloth or fleece liner. Cloth or fleece liners tend to hold moisture. Moisture held in the liner of a hood cover or bra may cause the vehicle's paint to oxidize, which creates "clouding" and discoloration. Moisture in the liner causes mildew, which destroys the cover or bra and damages the vehicle finish.

Other types of hood covers have been constructed from weather resistant elastic fabrics, which allow the covers to be stretched over vehicle hoods regardless of size, shape or style. While these hood covers using elastic fabrics provide improved wicking to reduce moisture problems, decorative graphics cannot be applied to these elastic fabrics. Embroidering graphics on these elastic fabrics, causes the fabrics to bind and distort when stretched over the hood. Graphics applied in a dye sublimation or other printing process bind and distort as the fabric is stretched over the vehicle hood. For example, a graphic of a circle on the hood cover will be distorted and appear as an oval or with a straight side when the cover is fitted to a vehicle hood.

SUMMARY OF THE INVENTION

The present invention provides a hood cover that can be fitted to any vehicle hood regardless of size, shape or style and that can be decorated with graphics and artwork which will not distort when fitted to different vehicle hoods. The hood cover is constructed from a sheet of elastic, weather-resistant fabric, which allows the hood cover to stretch tightly around the peripheral edges of the vehicle hood and lie flat across the top surface of the vehicle hood. The hood cover is secured to the vehicle hood by a draw string and by two adjustable tension straps. The first tension strap pulls the hood cover tight around rear hood corners. The second tension strap pulls the hood cover tight around the convex leading edge and the concave rear edge of the vehicle hood.

The fabric from which the hood cover is constructed prevents the distortion of decorative graphic artwork within certain areas of the hood cover. The blend, weave and sett of the fabric gives the hood cover "sequential elasticity" that allows fabric stretch to be isolated and localized around the periphery of the vehicle hood so that the central area of the hood cover will remain primarily "un-stretched." Consequently, graphics and artwork can be applied and arranged on the hood cover to minimize any distortions caused by stretching the hood cover over any particular vehicle hood.

These and other advantages of the present invention will become apparent from the following description of an embodiment of the invention with reference to the accompanying drawings.

BRIEF DESCRIPTION OF THE DRAWINGS

The drawings illustrate an embodiment of the present invention, in which.

DESCRIPTION OF THE PREFERRED EMBODIMENT

Figure 1:
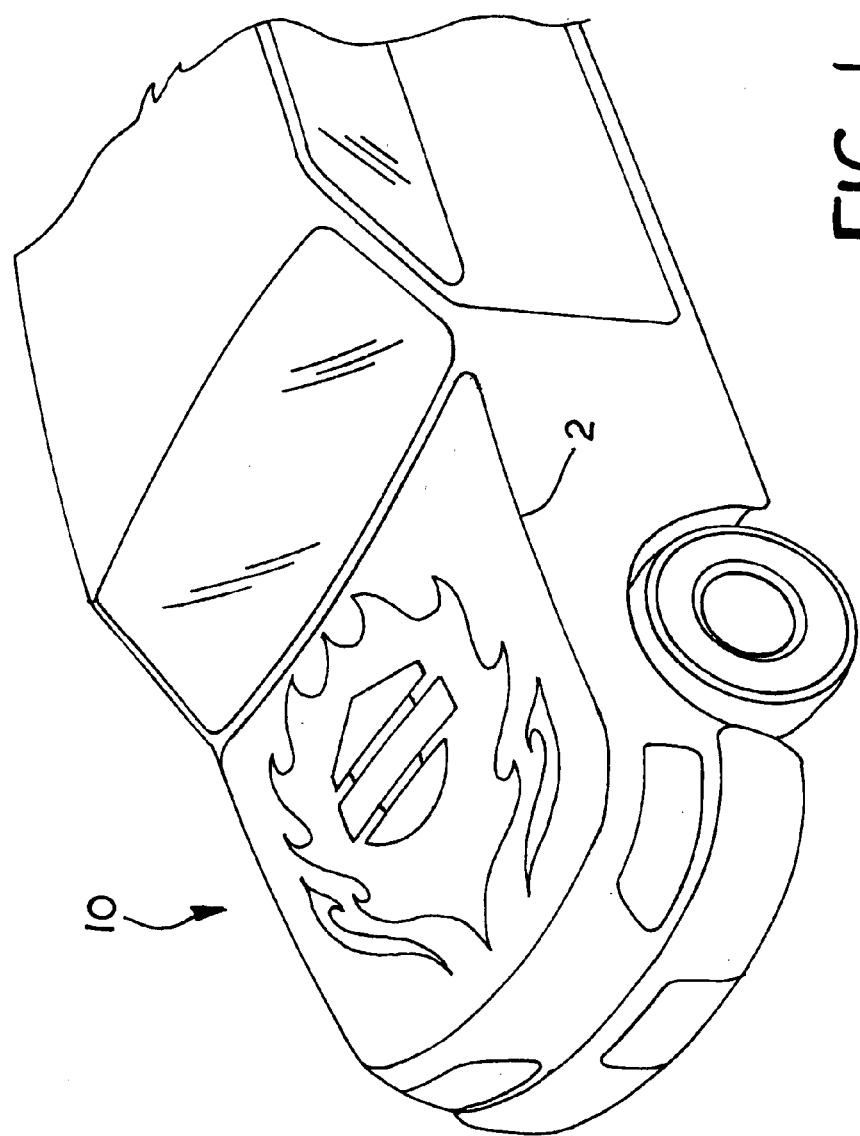
FIG. 1 is a perspective view of a vehicle with an embodiment of the hood cover of this invention fitted to its hood.
Figure 2:
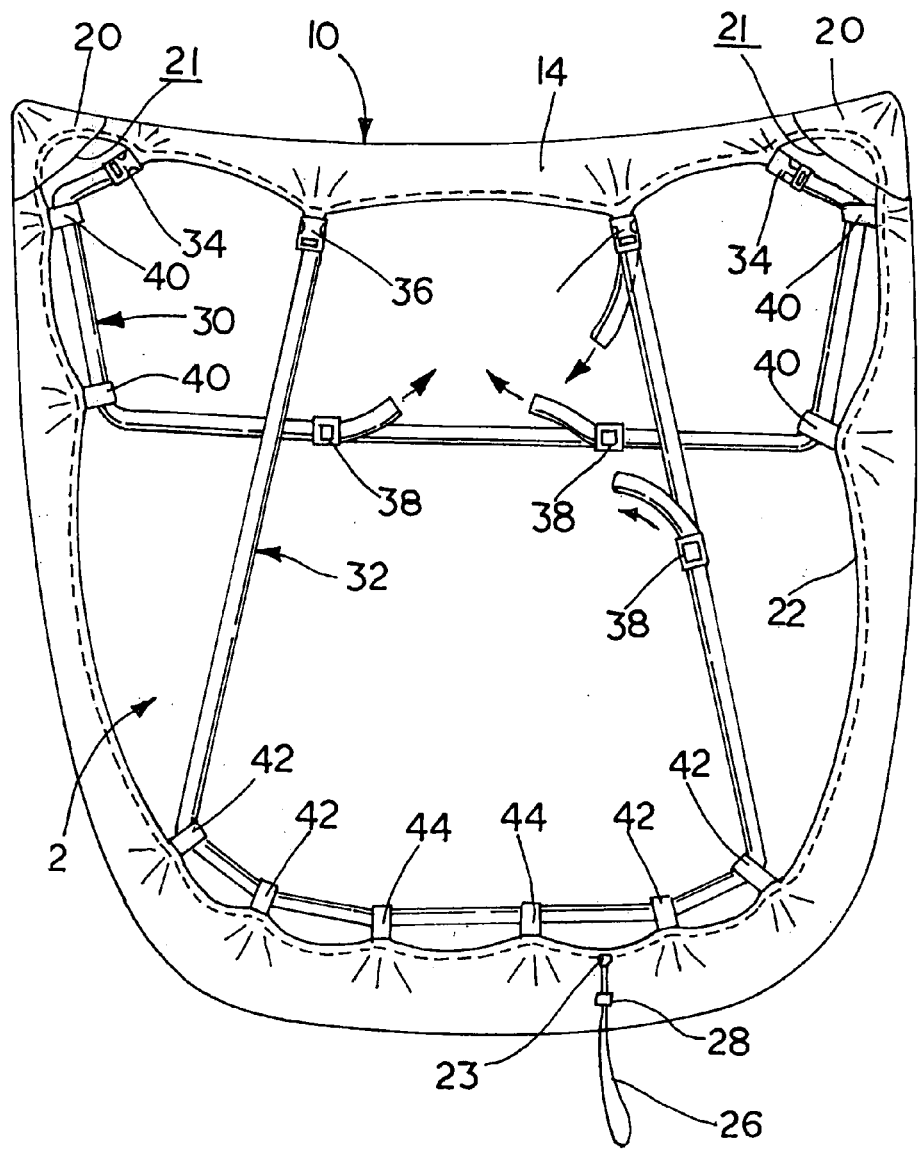
FIG. 2 is a bottom view of the hood cover fitted to the vehicle hood of FIG. 1.
Figure 3:
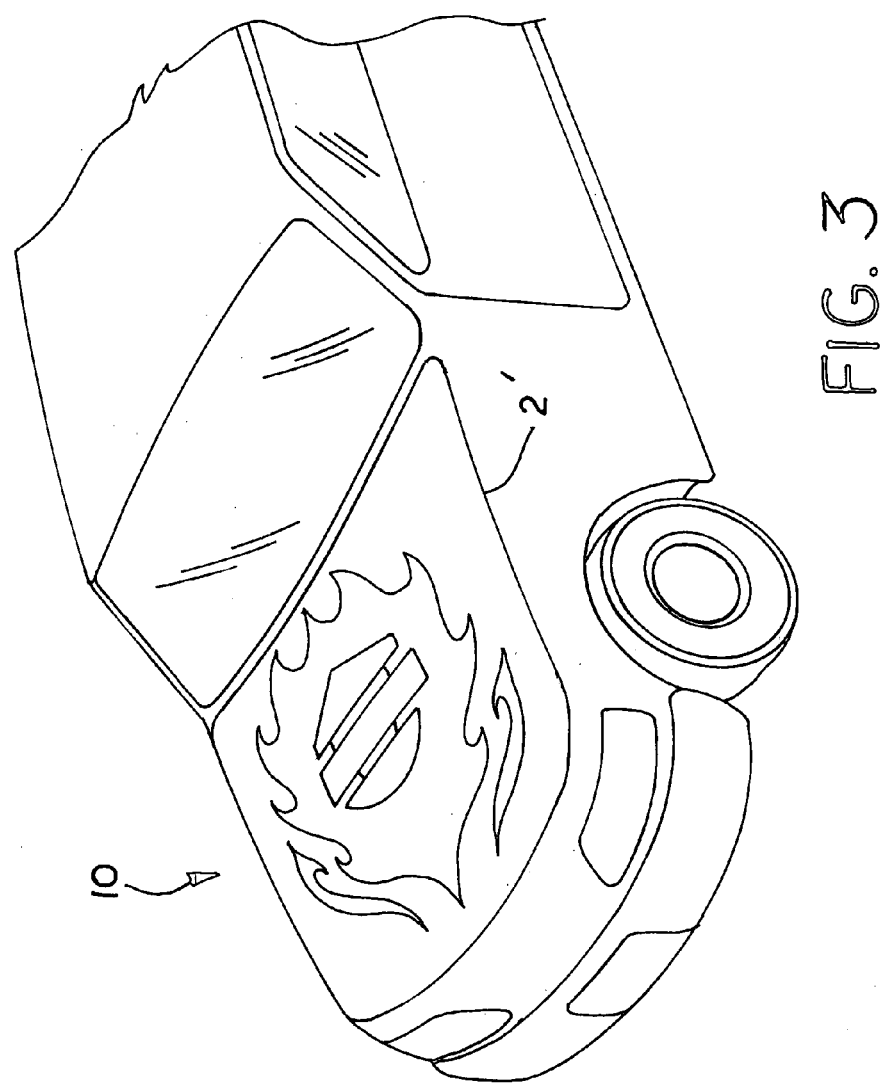
FIG. 3 is a perspective view of another vehicle with an embodiment of the hood cover of this invention fitted to its "drop nose" hood.

Referring now to the drawings, reference numeral 10 generally designates an embodiment of the hood cover of this invention. Hood cover 10 is designed to fit any vehicle hood regardless of size, shape or style. The shape of a vehicle hood is defined by the contour of the side, rear and leading edges. Typically, the rear edge of a vehicle is concave to follow the contour of the vehicle windshield. The leading edge of each vehicle hood is uniquely shaped and contoured; however, vehicle hoods are often styled to have a straight leading edge or a "drop nose" leading edge. The drawings illustrate hood cover 10 fitted to two common styles of vehicle hoods, a regular straight leading edged vehicle hood 2 (shown in FIGS. 1 and 2) and a drop nose vehicle hood 2' (shown in FIGS. 3 and 4).

Hood cover 10 is constructed from a sheet of elastic, weather-resistant fabric, which allows the hood cover to stretch tightly around the peripheral edges of vehicle hood 2 and lie flat across the top surface of vehicle hood 2. Hood cover 10 has two corner flaps 20, which form corner pockets 21. Corner pockets 21 receive the rear corners of vehicle hood 2 to properly position hood cover 10 on the vehicle hood.

Hood cover 10 is secured to vehicle hood 2 in part by a draw string 26. The peripheral edge of hood cover 10 is hemmed to form a tube 22, in which draw string 26 is inserted. Draw string 26 extends through tube 22 and protrudes from an eyelet 23 formed in the tube by a surge stitch. Draw string 26 is tightened by a cord lock 28. When fitted to vehicle hood 2, hood cover 10 is stretched over the top surface of vehicle hood 2 so that a peripheral under-fold 14 underlies the bottom surface of vehicle hood 2. Draw string 26 is tightened to pull tube 22 toward the center and draw top surface 12 of hood cover 10 flat across the top surface of vehicle hood 2.

Hood cover 10 is also secured to a vehicle hood in part by two adjustable tension straps 30 and 32. Both ends of first adjustable tension strap 30 are connected to hood cover 10 along its rear edge by a pair of quick release connectors 34 adjacent corner pockets 21. Likewise, both ends of second adjustable tension strap 32 are connected to hood cover 10 along its rear edge by another pair of quick release connectors 36. Quick release connectors 34 and 36 include a pair of male connector parts fitted to the ends of each tension strap 30 and 32, and corresponding female connector parts attached to tube 22. Each tension strap 30 and 32 also has a pair of buckles 38, which allow the length of strap between the male connector parts to be selectively adjusted.

Figure 4:
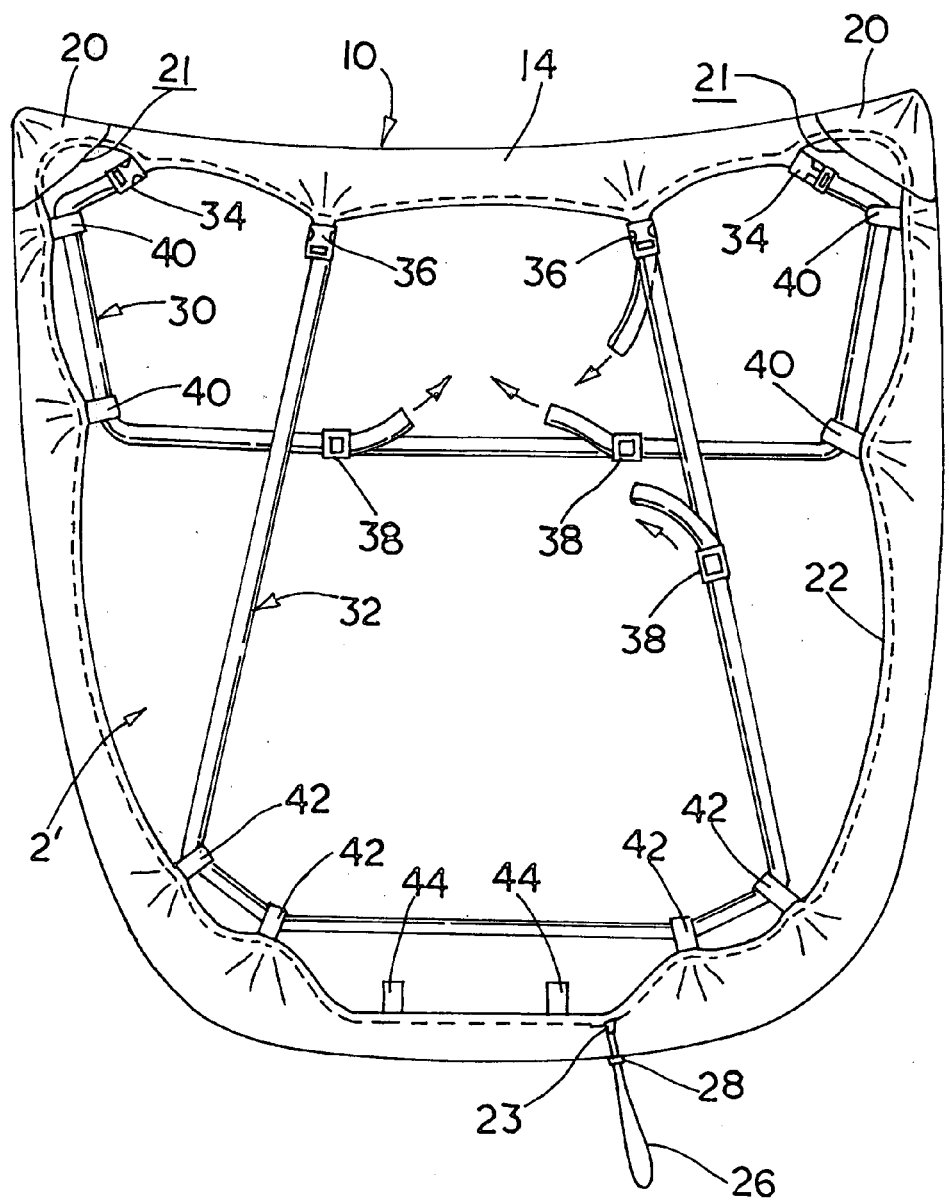
FIG. 4 is a bottom view of the hood cover fitted to the vehicle hood of FIG. 3.

Hood cover 10 has several web loops sewn to tube 22, which are spaced around the periphery of the cover. As shown, two side web loops 40 extend from tube 22 spaced along the side edges of hood cover 10 near corner pockets 21. Another pair of front corner web loops 42 extend from tube 22 spaced along the front corner edges of hood cover 10. Two additional center web loops 44 extend from tube 22 spaced at the center of the leading edge of hood cover 10. Tension straps 30 and 32 pass through the web loops and are tightened to stretch and tension hood cover 10 across vehicle hood 2. First adjustable tension strap 30 passes through web loops 40 on both sides of hood cover 10. First tension strap 30 pulls hood cover tight around rear hood corners. Second tension strap 32 passes through web loops 42 and 44 for a straight leading edge vehicle hood 2 (FIG. 2) or through web loops 42 only for a "drop nose" vehicle hood 2' (FIG. 4). Second tension strap 32 pulls hood cover 10 tight around the convex leading edge and the concave rear edge of vehicle hood 2. For a drop nose vehicle hood 2', draw string 26 alone is sufficient to secure hood cover 10 over the drop nose portion of the vehicle hood.

The fabric from which hood cover 10 is constructed has several unique properties that distinguish the hood cover of this invention. The hood cover fabric has a knit weave pattern and sett, where the sett is the weft and warp density usually defined in terms of thread count, which allows high elasticity characterized than other conventional polyester blend fabrics. The fabric has a hand elongation rating between 135% and 150% in both length and width. The fabric has a smooth top surface and a fleece like bottom surface, which gives the fabric a good "hand," i.e., the actual feel of the fabric having great resilience and softness, fineness and is pleasing to the touch. The fabric blend also contains additional fibers that enhance the shine and luster of the outer surface. The weave and sett of the fabric is also selected to have enhanced water resistance and wicking properties. The fabric blend is selected so that water beads and runs off the top surface of hood cover 10 while moisture is to be drawn through the fabric away from the vehicle hood where it will evaporate off the top surface.

Figure 5:
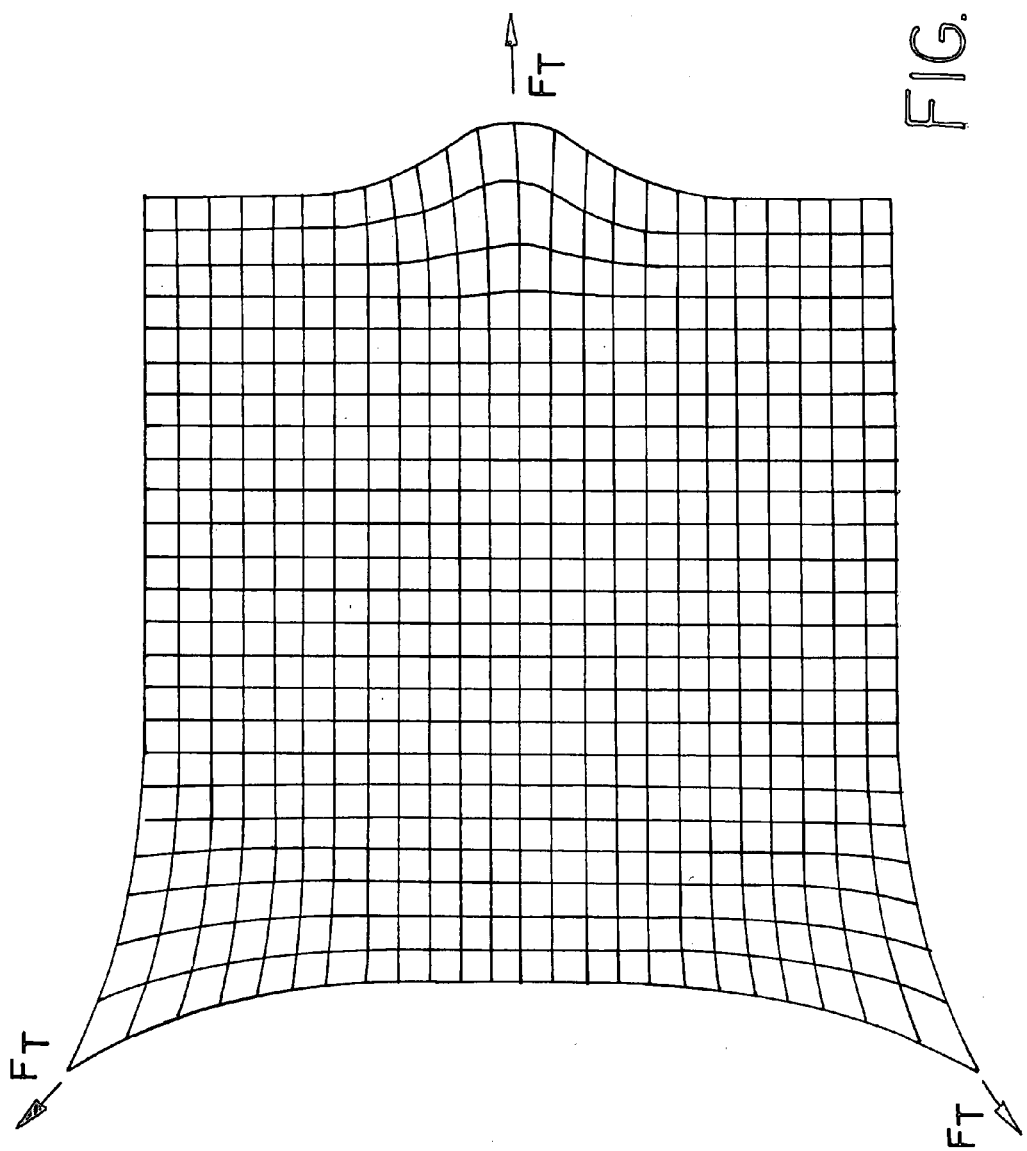
FIG. 5 is a simplified illustration of the sequential elasticity of the fabric used in the hood cover of this invention.

The fabric from which hood cover 10 is constructed also has unique elastic properties, which prevent the distortion of decorative graphics and artwork, within certain areas of the hood cover. The blend, weave and sett of the fabric gives hood cover 10 "sequential elasticity." This "sequential elasticity" allows fabric stretch to be isolated and localized around the periphery of vehicle hood 2 allowing the central area of hood cover 2 to remain primarily "un-stretched." A simple link chain is the best illustration of "sequential elasticity" of the hood cover fabric. The weave and sett of the fabric is similar to a linked chain that is laid straight but the links are pushed together linearly to overlap. When one end of the link chain is pulled to stretch the chain, the tension on the chain is transmitted sequentially one link at a time through each successive link. Similarly, when hood cover 10 is fitted to a hood, the fabric stretches sequentially from the outside or periphery inward. As shown in FIG. 5, "fabric stretch" caused by a diagonal tension force FT at the corners of the fabric or a orthogonal tension force FT along the sides of the fabric is propagated in "sequentially isolation" where the fabric threads local to the tension force are stretched substantially to their limit before subsequent adjacent threads are stretched. Conventional fabrics propagate the tension force across the entire fabric matrix. The "fabric stretch" of hood cover 2 occurs primarily around the periphery of vehicle hood 2 and the central area of the hood cover is substantially isolated from any fabric stretch. Consequently, the "sequential elasticity" of the fabric allows hood cover 2 to stretch over any size, shape or style of hood without substantially distorting decorative graphics applied to the hood cover.

Figure 6:
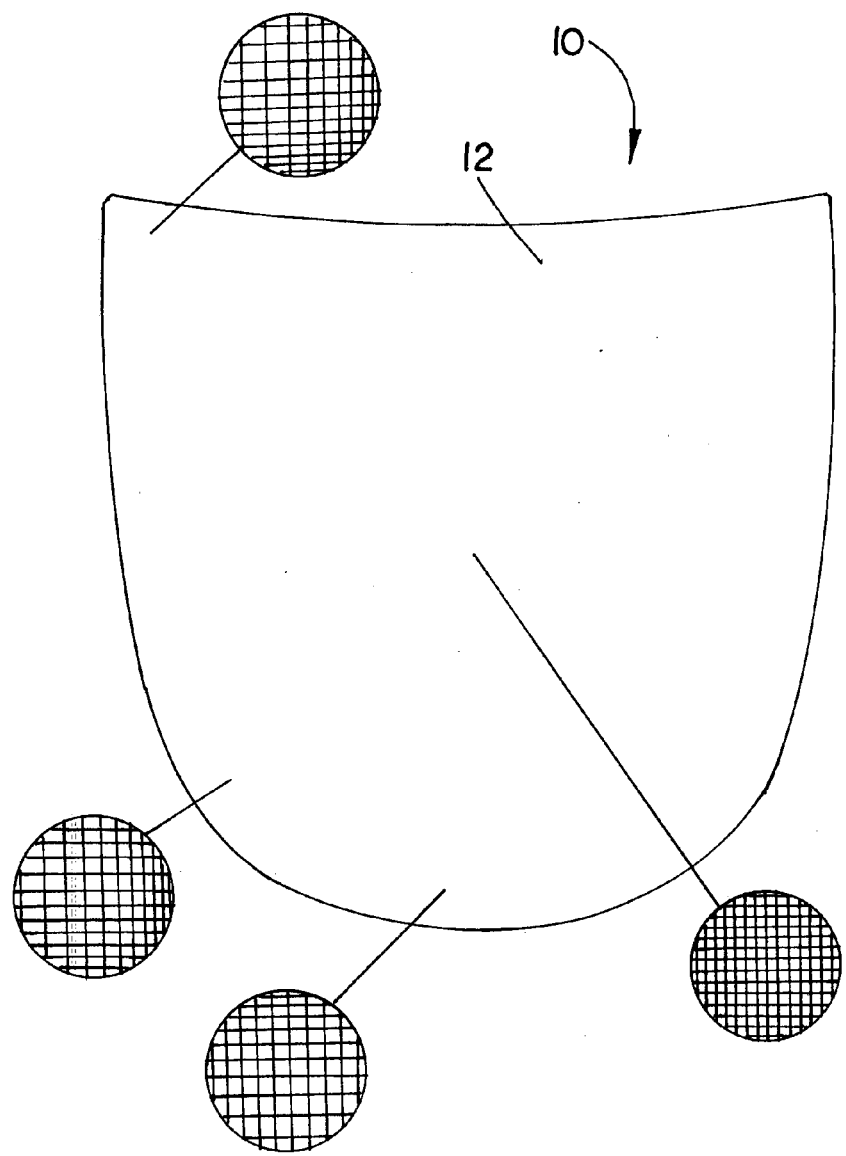
FIG. 6 is a simplified top view of the hood cover fitted to the vehicle hood of FIG. 1 illustrating the "fabric stretch" of the hood cover at different areas of the hood cover.
Figure 7:
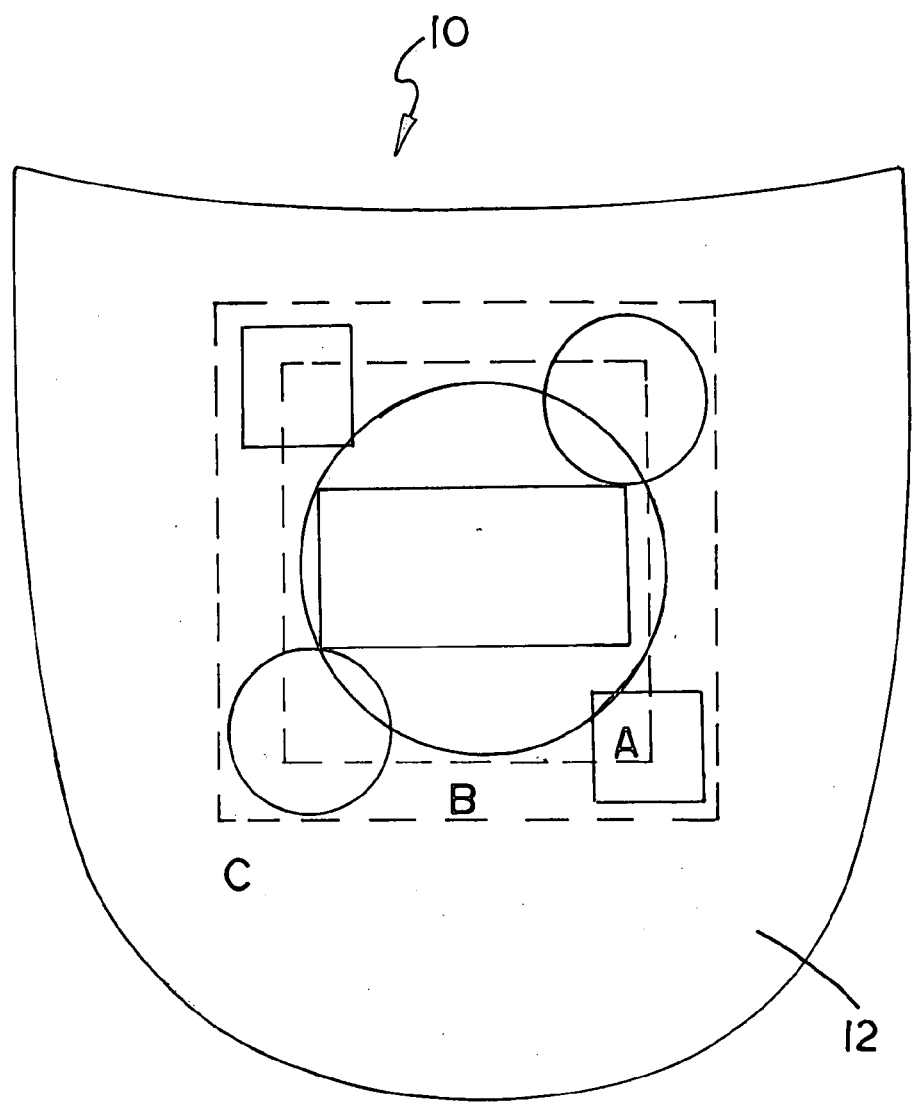
FIG. 7 is a top view of the hood cover fitted to the vehicle of FIG. 1 showing the central, intermediate and peripheral graphic areas.
Figure 8:
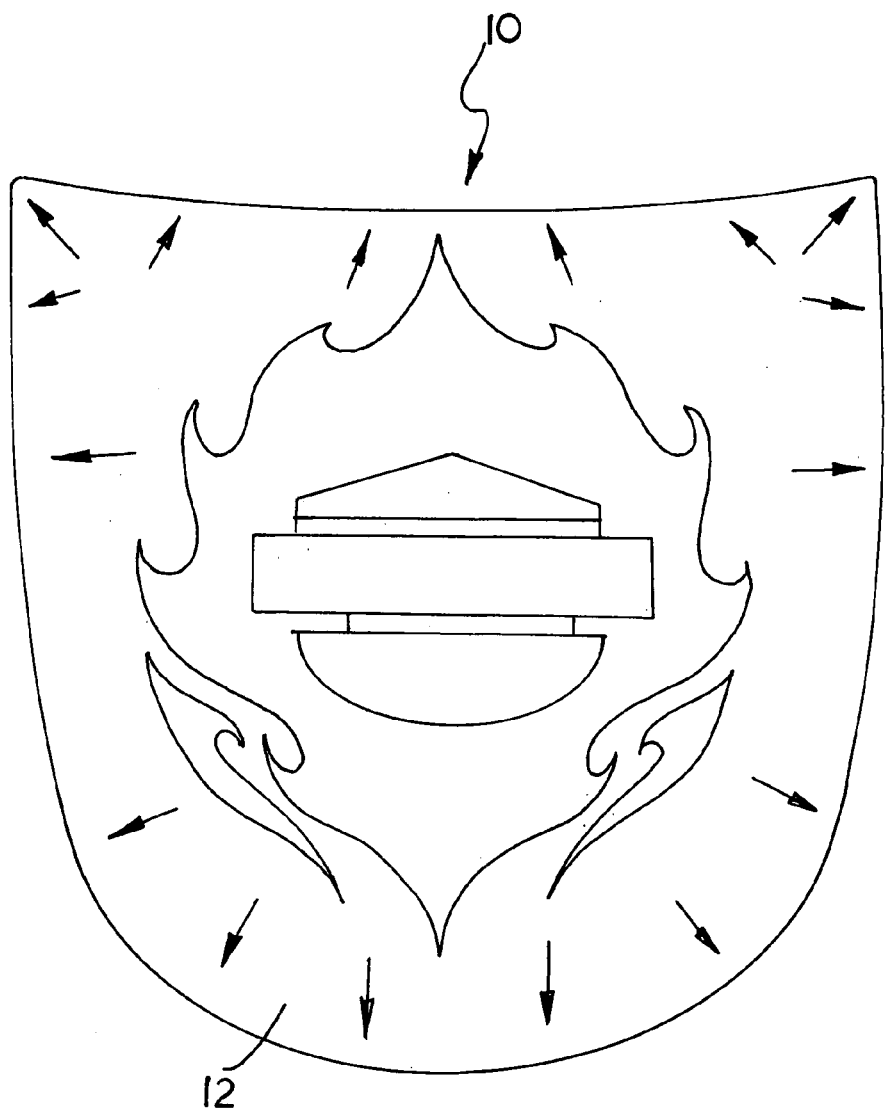
FIG. 8 is a top view of the hood cover fitted to the vehicle of FIG. 1 showing a typical decorative graphic and artwork.

The "sequential elasticity" of the fabric used in hood cover 10 allows decorative graphics and artwork to be applied to the surface of hood cover 10 in a systematic method without regard to distortion of graphics and artwork when the hood cover is fitted to different vehicle hoods. As shown in FIG. 6, fabric stretch is generally greatest along the leading edge and at the front and rear covers of a vehicle hood. The fabric stretch is the least along the rear edge of the vehicle and centered along the side edges of the vehicle hood. As shown in FIG. 7, the central area (designated generally as reference letter A) of hood cover 10 can be decorated with graphics and artwork that have large distinct graphic shapes, such as circles and polygons. Circles and polygons are distinctive shapes that if distorted would be visibly noticeable. Because the curve of a circle is equal distance from a center point any distortion is visibly noticeable. Likewise, distortions in the straight lines and angles of the polygon are also readily noticeable. Within central area A, any distinctive shape can be used in a decorative graphic without being distorted when hood cover 10 is fitted to hood 2. Generally, the dimensional area of central area A is between 4.000 and 6.250 square feet when fitted to a conventional vehicle hood. The shape of central area A also varies with the size, shape and style of the vehicle hood, as well as the size and distinctiveness of the shapes and lines in the graphic artwork applied to the hood cover. It should be noted that central area A is not located in the center of hood cover 10. Due to the concave rear edge of vehicle hood 2, little tension is applied to the fabric across the back edge of hood cover 10. As such, central area A can extend further toward the back edge of hood cover 10.

Hood cover 10 also has an intermediate area (designated generally as reference letter B), which is approximately 6.0 inches wide surrounding central area A. Generally, the dimensional area of intermediate area B is between 2.25 square inches and 2.75 square inches. When hood cover 10 is fitted to a vehicle hood, the fabric within intermediate area B experiences very little stretch. Intermediate area B can be decorated with graphics and artwork having distinctive shapes, which are typically 25-50 percent smaller than the distinctive shapes used in central area A. Reducing the relative size of any distinctive shapes used in the graphics and artwork within intermediate area B eliminates any visible distortion thereof, which may be caused by the small amounts of fabric stretch across the intermediate area.

The remaining peripheral area of hood cover (designated generally as reference letter C) can be decorated with graphics and artwork that have only non-distinctive shapes, curved lines, contours and textures. Most of the fabric stretch experienced by hood cover 10 occurs within peripheral area C. Any distortions caused by fabric stretch within peripheral area C will not detract from the appearance of the decorative graphics and artwork on hood cover 10.

One skilled in the art will note several advantages demonstrated by the hood cover embodying this invention. The unique elastic properties of the fabric also allows decorative graphics and artwork to be applied to the hood cover, whose appearance will not be distorted when the hood cover is fitted to different vehicle hoods. The fabric accepts decoration using convenient dye sublimation processes. By applying the most distortion sensitive graphics and art work to the central area of the hood and using less distortion sensitive graphics and artwork around the periphery of the hood cover, the hood cover can be adorned with more creativity. Hood covers can now be adorned with distinctive graphic artwork without their appearance being altered or distorted.

Beyond the decorative advantages of the hood covers, one skilled in the art will note that the hood covers can be adapted for advertising purposes. Because the hood cover can be fitted to any vehicle hood regardless of size, shape or style without having the decorative graphic artwork applied to the surface of the hood cover distorted, advertisers can apply their logos and brand names as well as actual photographs and pictures of products to the hood covers. The hood covers can then be fitted to cabs, delivery trucks and other vehicles as a form of moving advertisement.

The hood cover also demonstrates several practical advantages. The draw string and tension straps ensure that the hood cover can be readily fitted to any vehicle hood. The tension straps also ensure that the hood cover drapes nicely over the vehicle hood and is tensioned across the top of the hood to prevent the fabric from flapping when the vehicle is in motion. The web loops allow the straps to secure the hood cover to both straight edge vehicle hoods and "drop nose" vehicle hoods.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A decorative hood cover for a vehicle hood, where the vehicle hood has a leading edge, a concave rear edge spaced opposite the leading edge and two spaced side hood edges each contiguous between the leading edge and the rear edge, the hood cover comprising:
   a sheet of elastic fabric adapted to be fitted over the vehicle hood so that a peripheral portion of the sheet is folded under the vehicle hood and terminating in a peripheral tube;
   a draw string extending through the tube for securing the hood cover to the vehicle hood and stretching the fabric sheet across the hood top surface;
   a pair of corner flaps sewn to the fabric sheet to form spaced corner pockets for receiving the rear corners of the vehicle hood;
   a first plurality of web loops sewn to the fabric sheet adjacent the corner pockets;
   a first elongated strap for stretching the fabric sheet taut around the rear corners of the vehicle hood and the side edges of the vehicle hood, the first strap extending through the first plurality of web loops when connected to the tube and having each end detachably connected to the tube between the corner pockets;
   a second plurality of web loops sewn to the tube spaced from the corner pockets; and
   a second elongated strap for stretching the fabric sheet taut around the leading edge of the vehicle hood and the rear edge of the vehicle hood, the second strap extending through the second plurality of web loops when connected to the tube and having each end detachably connected to the tube between the first strap ends.

2. The hood cover of claim 1 wherein the fabric sheet has a top surface upon which graphic artwork is applied, the fabric top surface having a central area thereof within which the fabric sheet is not stretched when the hood cover is fitted to a vehicle hood so that the graphic artwork within the central area is not visibly distorted.

3. The hood cover of claim 2 wherein the fabric top surface having a peripheral area thereof around the central area within which the fabric sheet is stretched when the hood cover is fitted to the vehicle hood so that the graphic artwork within the peripheral area may be visibly distorted.

4. The hood cover of claim 2 wherein the central area has a dimensional area between 4.00 square feet and 6.25 square feet when the hood cover is fitted to the vehicle hood.

5. The hood cover of claim 1 wherein each of the first strap and the second strap includes means for adjusting the length thereof.

6. A decorative hood cover for a vehicle hood, where the vehicle hood has a leading edge, a concave rear edge spaced opposite the leading edge and two spaced side hood edges each contiguous between the leading edge and the rear edge, the hood cover comprising:
   a sheet of elastic fabric adapted to be fitted over the vehicle hood so that a peripheral portion of the sheet is folded under the vehicle hood, the fabric sheet has a top surface upon which graphic artwork is applied, the fabric top surface having a central area thereof within which the fabric sheet is not stretched when the hood cover is fitted to the vehicle hood so that the graphic artwork within the central area is not visibly distorted.

7. The hood cover of claim 6 wherein the fabric top surface having a peripheral area thereof around the central area within which the fabric sheet is stretched when the hood cover is fitted to the vehicle hood so that the graphic artwork within the peripheral area may be visibly distorted.

8. The hood cover of claim 6 wherein the central area has a dimensional area between 4.00 square feet and 6.25 square feet when the hood cover is fitted to the vehicle hood.

9. The hood cover of claim 6 wherein the fabric sheet terminates in a peripheral tube, the hood cover also includes
   a draw string extending through the tube for securing the hood cover to the vehicle hood and stretching the fabric sheet across the hood top surface,
   a pair of corner flaps sewn to the fabric sheet to form spaced corner pockets for receiving the rear corners of the vehicle hood,
   a first plurality of web loops sewn to the fabric sheet adjacent the corner pockets,
   a first elongated strap for stretching the fabric sheet taut around the rear corners of the vehicle hood and the side edges of the vehicle hood, the first strap extending through the first plurality of web loop when connected to the tube and having each end detachably connected to the tube between the corner pockets,
   a second plurality of web loops sewn to the tube spaced from the corner pockets,
   a second elongated strap for stretching the fabric sheet taut around the leading edge of the vehicle hood and the rear edge of the vehicle hood, the second strap extending through the second plurality of web loops when connected to the tube and having each end detachably connected to the tube between the first strap ends.

10. The hood cover of claim 9 wherein each of the first strap and the second strap includes means for adjusting the length thereof.

* * * * *